US010723238B2

(12) United States Patent
Hortop et al.

(10) Patent No.: US 10,723,238 B2
(45) Date of Patent: Jul. 28, 2020

(54) DELAYED BATTERY CHARGING FOR ELECTRIC VEHICLES BASED ON STATE OF CHARGE

(71) Applicant: Rivian IP Holdings, LLC, Plymouth, MI (US)

(72) Inventors: Matthew Hortop, Ann Arbor, MI (US); Patrick Hunt, Evanston, IL (US)

(73) Assignee: Rivian IP Holdings, LLC, Plymouth, MI (US)

( * ) Notice: Subject to any disclaimer, the term of this patent is extended or adjusted under 35 U.S.C. 154(b) by 84 days.

(21) Appl. No.: 15/669,101

(22) Filed: Aug. 4, 2017

(65) Prior Publication Data

US 2019/0039467 A1 Feb. 7, 2019

(51) Int. Cl.
*H02J 7/00* (2006.01)
*B60L 53/64* (2019.01)
*B60L 58/12* (2019.01)

(52) U.S. Cl.
CPC ............... *B60L 53/64* (2019.02); *B60L 58/12* (2019.02); *H02J 7/0072* (2013.01)

(58) Field of Classification Search
CPC ..... Y02T 90/14; Y02T 90/128; Y02T 90/163; Y02T 10/7005; Y02T 10/7088; B60L 11/184; B60L 11/1861; H02J 7/0072
USPC .......................................................... 320/101
See application file for complete search history.

(56) References Cited

U.S. PATENT DOCUMENTS

| | | |
|---|---|---|
| 8,054,038 B2 | 11/2011 | Kelty et al. |
| 9,056,552 B2 | 6/2015 | Muller et al. |
| 9,128,510 B2 | 9/2015 | Federico et al. |
| 9,156,367 B2 | 10/2015 | Matsuno et al. |
| 2005/0134225 A1* | 6/2005 | Mese ............... H01M 10/42 320/132 |
| 2010/0141219 A1* | 6/2010 | Li .................... H01M 10/441 320/162 |
| 2011/0191220 A1* | 8/2011 | Kidston ............ H02J 7/02 705/34 |
| 2013/0314043 A1* | 11/2013 | Bouman ........... H02J 7/0073 320/109 |

(Continued)

OTHER PUBLICATIONS

Nissan 2012 LEAF Owner's Manual, Nov. 2011, 354 pages.

(Continued)

*Primary Examiner* — Richard Isla
*Assistant Examiner* — Mohammed J Sharief
(74) *Attorney, Agent, or Firm* — Clements Bernard Walker

(57) ABSTRACT

Approaches for charging a battery for an electric vehicle involve obtaining battery usage metrics of the battery of the electric vehicle based upon past usage of the battery and past charging of the battery. The metrics are analyzed to determine a target state of charge (SOC) for a first type of vehicle usage and determine a charging scheme as a function of time to achieve the target SOC at a first predetermined time. The charging scheme includes a first time period and a subsequent second time period, wherein an average rate of delivering charge to the battery during the second time period is greater than an average rate of delivering charge to the battery during the first time period. The battery is charged according to the charging scheme until the battery reaches the target SOC, which is less than a maximum state of charge for the battery.

16 Claims, 7 Drawing Sheets

(56) References Cited

U.S. PATENT DOCUMENTS

| | | | |
|---|---|---|---|
| 2014/0132225 A1* | 5/2014 | Jagenstedt | H02J 7/007 320/160 |
| 2014/0217958 A1* | 8/2014 | Verdun | H02J 7/0057 320/107 |
| 2014/0347018 A1 | 11/2014 | Boblett et al. | |
| 2016/0047862 A1* | 2/2016 | Shimizu | B60L 53/60 702/63 |
| 2016/0190827 A1* | 6/2016 | Ezawa | G01R 31/392 320/107 |
| 2017/0129361 A1* | 5/2017 | Scaringe | B60L 11/1861 |

OTHER PUBLICATIONS

Chevrolet 2016 VOLT Owner's Manual, 2015, 368 pages.
K. Young, et al., Electric Vehicle Battery Technologies, Chapter 2, in Electric Vehicle Integration into Modern Power Networks, Eds. R. Garcia-Valle and J. A. Pecas Lopes, Springer, New York, 2013, pp. 15-56.
O. Isaksson and A. Fagerholt, Smart Charging for Electric Vehicles, Ericsson Business Review (EBR) #3, 2012, pp. 33-36.

* cited by examiner

DELAYED BATTERY CHARGING FOR ELECTRIC VEHICLES BASED ON STATE OF CHARGE

BACKGROUND

Field of the Disclosure

The present disclosure relates to batteries for electric vehicles, including hybrid vehicles, and more particularly to systems and methods for intelligent charging of vehicle batteries to reduce battery degradation.

Background Information

Electric vehicles, including hybrid vehicles, are of great interest for transportation applications and can provide benefits of low or zero emissions, quiet operation, and reduced dependence upon fossil fuels. Conventional batteries for electric vehicles may include lithium-ion batteries, nickel-metal-hydride batteries, cobalt dioxide batteries, and others. Common challenges associated with battery systems for electric vehicles include high capital cost of the batteries themselves, reductions in charging/discharging performance over time, reduction in energy storage capacity over time, and variability in performance among batteries.

The present inventors have observed a need for improving the charging of batteries for electric vehicles, improving battery lifetime, and mitigating battery degradation that can occur over time. Exemplary embodiments described herein may address one or more of these needs.

SUMMARY

The present inventors have observed that the proliferation of electric vehicles and the high cost of batteries for those vehicles, as well as the complexities of battery performance depending upon the manner of battery usage and the environmental conditions under which certain battery usage occurs, present a challenging technical problem of how to effectively and efficiently analyze battery behavior under different charging approaches depending on a vast potential array of intertwined historical vehicle usage situations and environmental conditions so as to select and implement a preferred charging scheme(s) for a particular battery for a given charging event given its particular historical usage and historical charging under a multitude of conditions, wherein the preferred charging scheme may enhance battery life and/or reduce overall usage cost of the battery including the electricity cost of charging balanced against other cost factors. The present inventors have observed that the opportunity exists for gathering and analyzing voluminous data regarding battery usage and battery performance under varied environmental conditions and under different charging histories for a multitude of batteries of electric vehicles, such as autonomous vehicles of a fleet, and that this vast body of data can be monitored and analyzed by suitable analytics and computer modeling on an ongoing basis (e.g., weekly, daily, hourly, minute-by-minute, essentially real time) to generate preferred charging schemes that can be applied to a particular battery at given times so as to provide a technical solution to the problem noted above.

According to an example, a method of charging a battery for an electric vehicle is described. The method comprises obtaining battery usage metrics of the battery of the electric vehicle, the battery usage metrics being based upon past usage of the battery and past charging of the battery; analyzing the battery usage metrics to determine a target state of charge for a first type of vehicle usage; determining a charging scheme for the battery as a function of time to achieve the target state of charge at a first predetermined time, wherein the charging scheme includes a first time period and a second time period, the second time period beginning after the end of the first time period, wherein according to the charging scheme an average rate of delivering charge to the battery during the second time period is greater than an average rate of delivering charge to the battery during the first time period; and controlling charging circuitry for charging the battery according to the charging scheme until the battery reaches the target state of charge, wherein the target state of charge is less than a maximum state of charge for the battery.

According to another example, a system for charging a battery of an electric vehicle is described. The system comprises power-input circuitry for receiving input power from a power source; charging circuitry for receiving the input power and for charging a battery of an electric vehicle; a computer processing system; and a memory coupled to the processing system. The processing system is configured to: obtain battery usage metrics of the battery of the electric vehicle, the battery usage metrics being based upon past usage of the battery and past charging of the battery; analyze the battery usage metrics to determine a target state of charge for a first type of vehicle usage; determine a charging scheme for the battery as a function of time to achieve the target state of charge at a first predetermined time, wherein the charging scheme includes a first time period and a second time period, the second time period beginning after the end of the first time period, wherein according to the charging scheme an average rate of delivering charge to the battery during the second time period is greater than an average rate of delivering charge to the battery during the first time period; and control the charging circuitry to charge the battery according to the charging scheme until the battery reaches the target state of charge, wherein the target state of charge is less than a maximum state of charge for the battery.

According to another example, a non-transitory computer-readable medium comprises computer instructions adapted to cause a processing system to execute the above-described steps.

DETAILED DESCRIPTION OF EXEMPLARY EMBODIMENTS

Exemplary embodiments described herein relate to charging batteries for electric vehicles, including hybrid vehicles, and to systems and methods for state-of-charge based battery charging to reduce battery degradation over time.

Figure 1A:
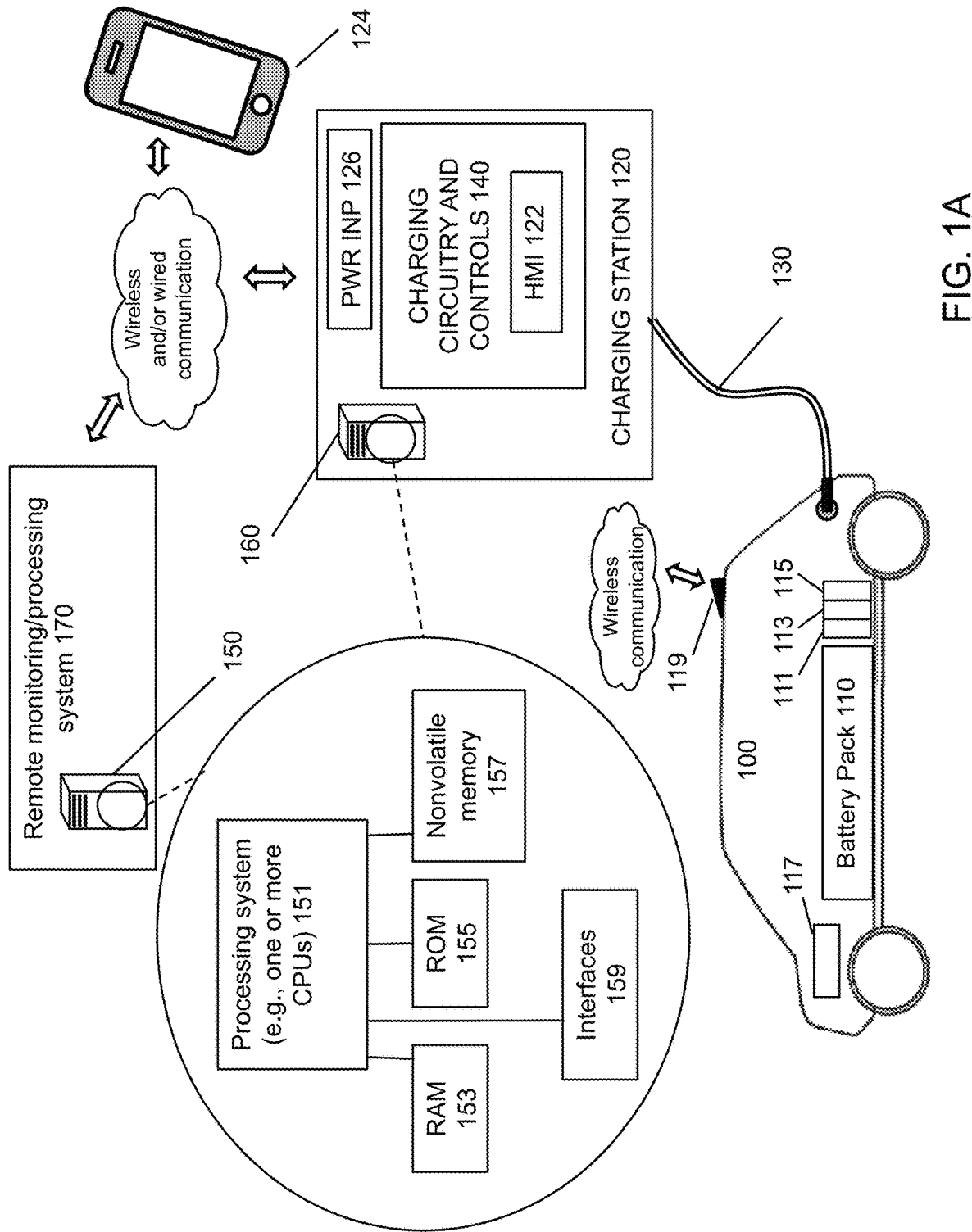
FIGS. 1A and 1B illustrate exemplary embodiments of a battery charging system for an electric vehicle according to examples of the disclosure.

FIG. 1A illustrates an exemplary embodiment of a battery charging system for an electric vehicle 100 for carrying human passengers and/or cargo according to an example of the disclosure. The vehicle may be an autonomous vehicle and/or configured to be driven by a human driver. As illustrated in FIG. 1A, the vehicle 100 with a battery pack 110 can be electrically coupled to a charging station 120 for charging the battery pack 110 via a charging cable 130 (the battery pack 110 may also be referred to herein simply as a battery 110). The charging cable 130 includes multiple electrical conductors therein and includes a suitable plug with multiple conductors at the end of the cable 130 that couples to a suitable receptacle at the vehicle 100. The electric vehicle 100 also includes a battery management system 111, onboard charging circuitry 113 and a DC/DC converter 115, which provide suitable circuitry for monitoring the state of charge (SOC) of the battery and operation of the battery and for providing the appropriate voltage level to onboard electronic systems. The vehicle 100 also includes an onboard computer 117 comprising a processing system (one or more CPUs) and a memory, and wireless transceiver(s) 119 (e.g., for cellular frequencies, Bluetooth, other wireless communication, or combinations thereof) which permit communication between the vehicle 100 (e.g., via the onboard computer 117) and a remote processing/monitoring system 170 that includes a computer system 150 (one or more computer processing units and associated memory). The remote processing/monitoring system 170 also includes suitable communications hardware including network transceivers for sending and receiving communication signals via wired and/or wireless communication and monitors the vehicle 100 and processes data regarding the vehicle's systems, usage, performance, environmental conditions, and the like. The charging station 120 may be powered by the electrical grid or some other source of electrical energy to enable the charging station 120 to charge the battery pack 110. The charging station 120 can provide substantial output power to charge the battery 100, for example, 2-5 kW, 20-25 kW, 50-55 kW, or greater than 55 kW. For relatively higher power outputs, the charging station may receive AC power at 240 V A/C or 480 V A/C and provide DC power to the electric vehicle via the charging cable.

The charging station 120 may include power-input circuitry 126 (e.g., a suitable wiring interface, circuit breakers or fuses, etc.) for receiving power from the grid or other high-power source, charging circuitry and controls 140 that facilitate the charging of battery 110 of the vehicle 100, and a computer system 160. The charging station also includes interface circuitry that permits the computer system 160 to communicate with and control the charging circuitry 140. The charging circuitry and controls 140 may include a variety of components for managing and controlling the charging process including, e.g., a transformer, rectifier circuitry, a charge controller for regulating current output, and a transceiver for wired and/or wireless communication, such as known in the art, for example. The charging station 120 may also include a human-machine interface 122 (HMI), such as a touch screen graphical user interface (GUI), which communicates with the charging circuitry 140, for selecting and controlling charging functionality. As would be readily understood by a person skilled in the art, similar or complementary circuits and controls may be present in the vehicle 100 to interface between the charging station 120 and the battery 110.

The computer system 150 (present at remote monitoring/processing system 170) and/or the computer system 160 present in the charging station 120 may work in conjunction with the charging circuitry and controls 140 to charge the battery 110 in accordance with methods and systems described herein. As illustrated, the computer system 150 and the computer system 160 may each include one or more processors 151, random access memory (RAM) 153, read only memory (ROM) 155, nonvolatile memory 157, and/or interfaces (e.g., an electrical interface coupled to a graphical user interface) 159. In some examples described herein, the methods and systems may be implemented in software and the software may be stored in one of the illustrated memories for execution by the one or more processors 151. According to one example, it may be desirable for functionality that identifies a particular charging scheme to be executed at the computer system 150 of the remote monitoring/processing system 170, since the remote/monitoring processing system may accumulate and update the most recent and relevant information regarding particular driving and charging history for the vehicle 100 and its associated battery pack 110. As noted above, such functionality may also be executed at computer system 160 at the charging station 120. Additionally, such decision functionality as described herein may be implemented at the computer system 117 at the vehicle 100. Accordingly, for the remainder of the disclosure, various functionality will be described with reference to the computer system 150 at the remote monitoring/processing system 170, but it should be understood that such functionality may optionally be carried out at the computer system 117 at the vehicle 100, the computer system 160 at the charging station 120, or may be shared among computer systems 150, 160, 117.

The HMI 122 communicates with the computer system 150 and can provide functionality, e.g., via a GUI, for powering on the charging circuitry 140, initiating charging, choosing and/or programming a charging scheme, choosing automatic smart charging (in which a charging profile may be selected based on historical metrics and predicted driving expectations as further described herein), overriding a default or present charging scheme, displaying to a user information about the charging process and state of charge (SOC) of the battery 110, and the like. Such functionality can also be controlled remotely though wired and/or wireless communication, for example, using a smart phone 124 or a remote computer such as a tablet executing an application (or app) to communicate with and control the charging station 120.

Figure 1B:
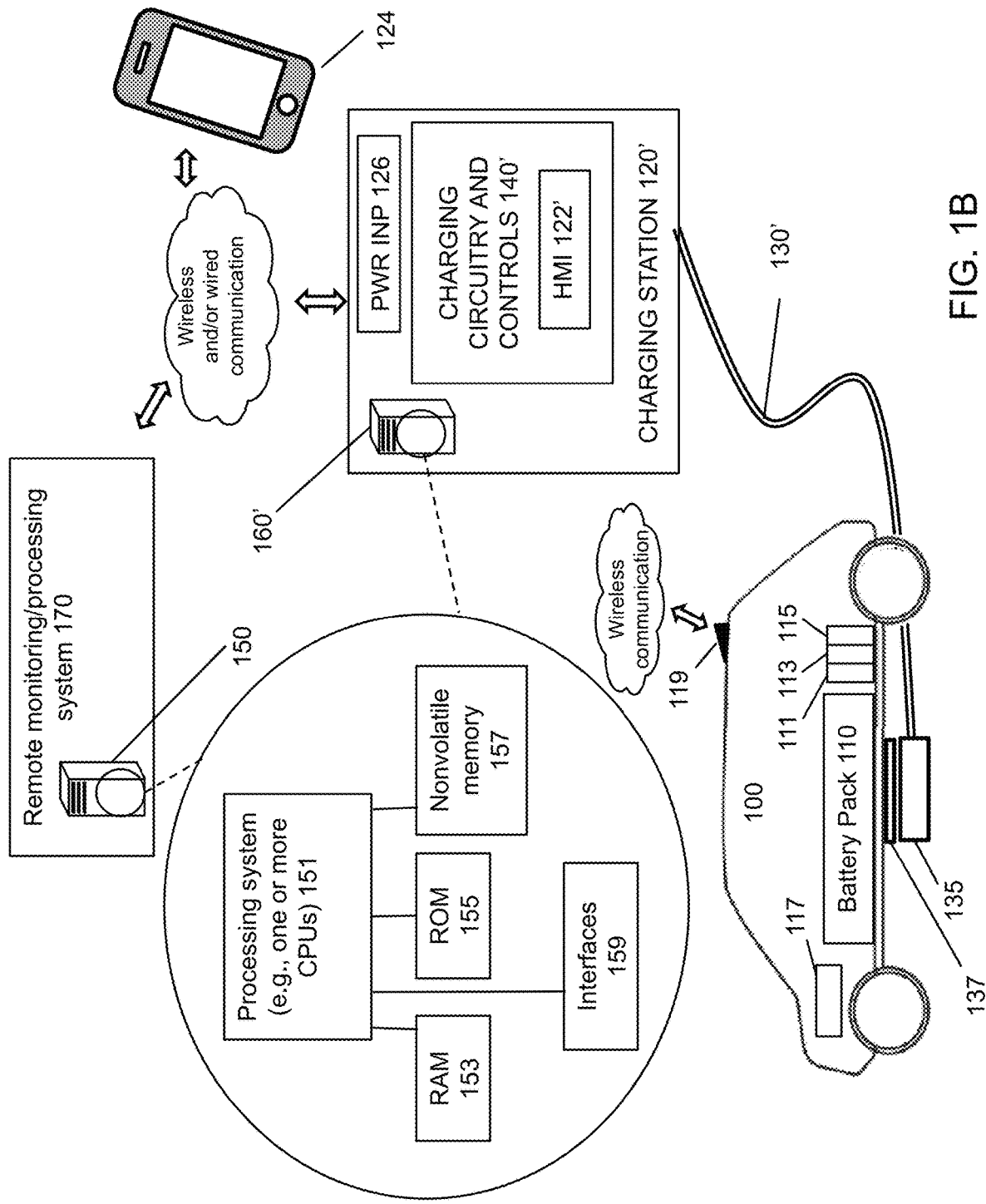

FIG. 1B illustrates another example for vehicle charging according to the present disclosure wherein inductive (wireless) charging of the vehicle battery 110 is utilized. In this example, charging station 120' comprises power-input circuitry 126 (e.g., a suitable wiring interface, circuit breakers or fuses, etc.) for receiving power from the grid or other high-power source, charging circuitry and controls 140' including a high frequency resonant inverter, which drives an (emitting) induction coil 135 via cable 130', and interface circuitry that permits the computer system 150 to communicate with and control the charging circuitry 140'. The charging station 120' also includes a HMI 122', such as a touch screen graphical user interface (GUI), which communicates with the charging circuitry 140, for selecting and controlling charging functionality. The oscillating electric field generated by induction coil 135 is coupled to a (receiving) induction coil 137 at the vehicle, the energy of which is then propagated to a high frequency rectifier and directed to the battery pack 110 for charging. Suitable high-frequency resonant invertors, (emitting) induction coils 135, (receiving) induction coils 137, and associated circuitry are known in the art, for example. The approaches described herein are applicable to both wired and wireless (inductive) charging.

The charging system 120, 120' and associated computer system 150, and/or the remote monitoring/processing system 170, and/or the onboard vehicle computer system 117 may include functionality for obtaining data regarding past battery usage, past battery charging, diagnostic information regarding state of health of the battery pack 110, and vehicle usage via wired or wireless communication from the vehicle 100, e.g., via wireless transceiver(s) 119, via cables 130, 130', or combination thereof. The battery pack 110 may have its own unique identification, such as a unique identification (ID) number or other identification code that may be electronically and/or physically readable (e.g., may be tagged with a bar code, QPC code, or the like, as well as an electronic ID). Thus, for example, in a fleet of electric vehicles 100, each vehicle may have its own unique vehicle identification number, and the battery pack 110 of each vehicle 100 may have its own unique battery identification number (e.g., so as to be able to catalog battery history uniquely for each battery 110 even where batteries 110 may be exchanged among vehicles 100). For example, battery monitoring sensors in the form of electrical circuits at the vehicle 110 may monitor battery usage such as battery discharge rate as a function of time during both driving periods and quiescent periods and such as regenerative charging as a function of time during driving. The vehicle 100 may also include a GPS unit for monitoring location, speed, and direction, accelerometers for measuring acceleration, deceleration and vibration, and various other suitable sensors for monitoring the health and status of other major systems of the vehicle and for detecting warning or fault conditions. Such data may be stored in an onboard vehicle computer system 117 with suitable memory and may be communicated to the remote monitoring system 170 and/or the computer system 150. In an example, the remote monitoring system 170, and/or the computer system 150, and/or the vehicle computer system 117 may calculate metrics based on battery usage and vehicle usage, e.g., that may relate to degrees of demand placed on the batteries and/or other vehicle systems experienced by a particular vehicle 100 and particular battery 110, which may be utilized in determining a suitable charging scheme for a given battery 110. For example, for a vehicle 100 that experiences rapid acceleration, rapid deceleration, significant jarring vibration or impacts (e.g., due to poor road conditions), high battery charging or discharging rates, extended periods at elevated battery SOC, temperature extremes, and the like, the associated battery 110 may have a shorter predicted (e.g., calculated) lifetime, and metrics based on such information can be utilized to determine (e.g., calculate, select) a suitable charging scheme for the vehicle battery 110 as will be described further herein.

Figure 2:
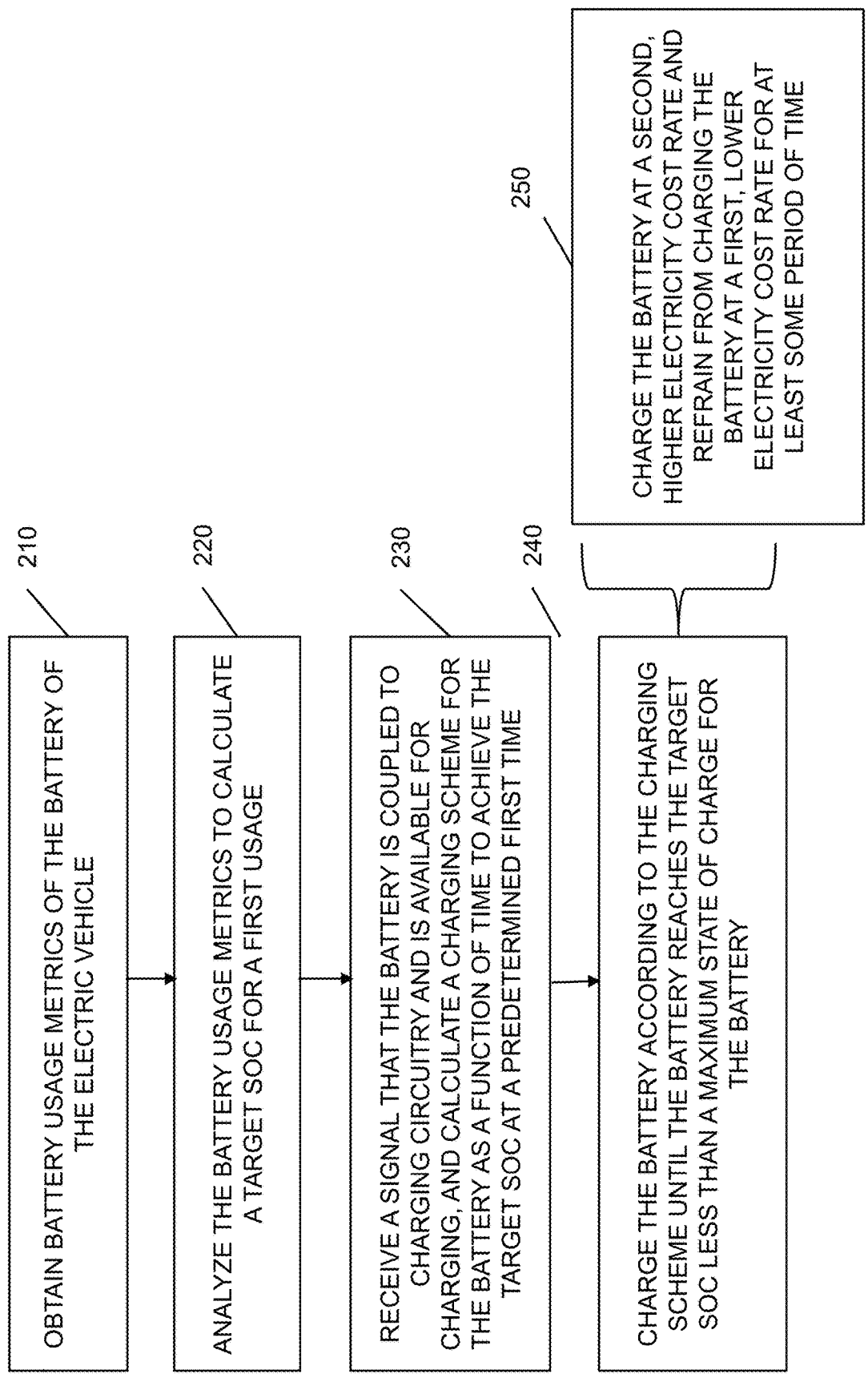
FIG. 2 is a flow chart of an exemplary approach for charging a battery of an electric vehicle according to an example of the disclosure.

FIG. 2 is a flow chart of an exemplary approach for charging a battery 110 of an electric vehicle 100 according to an example of the disclosure. The steps need not be carried out in the specific order illustrated. Moreover, the approach may be controlled by the remote monitoring/processing system 170, the computer system 150 of the charging system 120, the vehicle computer system 117, or any combination thereof. As shown in step 210, battery usage metrics related to the vehicle battery 110 are obtained, e.g., calculated at and/or retrieved from any of the computer systems 117, 150 and/or 170 noted above, for use in determining, e.g., calculating/selecting, a suitable charging scheme for the vehicle battery 110. The battery usage metrics can be based on past usage of the battery 110 and past charging of the battery 110. In examples, the battery usage metrics may include past battery charge usage amounts by day, departure times from a residence by day, return times to the residence by day, driving time by day, at-destination charging amounts and locations (if applicable), present battery charge information, historical charge levels of the battery as a function of time, discharge rates of the battery as a function of time, and/or historical time usage of the battery, metrics indicative of such quantities, as well as calculated metrics based thereon including statistical information (e.g., average departure time for weekdays, mode (most frequent/most likely) departure time for weekdays, average charge level and average discharge rate for a time period such as such as present age; median and mode charge levels for a time period such as present age; median and mode discharge rates for a time period such as present age; time spent at a maximum SOC for a time period such as present age; percentage of present age spent at maximum SOC; time spent at maximum discharge rate; percentage of present age spent at maximum discharge rate; and any combination thereof; etc.). Additionally, vehicle usage metrics other than battery usage metrics may also be obtained regarding the vehicle 100 for use in calculating, selecting or otherwise determining a suitable charging scheme for the vehicle battery 110. Such vehicle usage metrics may include metrics indicative of, e.g., average and maximum acceleration over a time period, average and maximum deceleration over a time period, force of isolated impacts, force/intensity and frequency of vibrations, average temperature that the battery 110 has experienced (e.g., as measured by one or more temperature sensors at the battery 110), average and cumulative time (or percentage of time to date) the battery 110 has experienced a temperature at or below a predetermined low-temperature threshold (e.g., 32° F.), average and cumulative time (or percentage of time to date) the battery 110 has experienced a temperature at or above a predetermined high-temperature threshold (e.g., 100° F.), for example.

At step 220, the battery usage metrics are analyzed to determine a target state of charge (SOC) for the battery for a particular type of vehicle driving usage. The target SOC for a particular usage is the amount of charge that is desired in the battery at the end of the charging period, i.e., before the driving event for that particular vehicle usage begins. For instance, one type of vehicle usage may be the (predictable) daily commute usage, and another type of vehicle usage may be (less predictable) weekend usage. Yet another type of usage may be delivery use, e.g., such as in a fleet of vehicles such as autonomous vehicles. For daily commute usage, the target SOC may be calculated from metrics of prior daily charge usage on work days so to provide sufficient charge for the daily commute plus some additional "buffer" charge for possible incidental excursions, e.g., a round trip commute of 20 miles plus a "buffer" of 10 miles for unexpected incidental excursions, while also accounting for at-destination charging (if applicable) for which the amount and location of charging which may be automatically monitored by vehicle 100 electronics and recorded among the battery usage metrics. In examples, the target SOC for the battery may be less than a maximum SOC attainable of the battery. For example, the maximum SOC attainable for the battery may be considered to be 100% of the present total charge capacity of the battery, and the target SOC may be 70%, 80%, or 90% of the maximum SOC. In other examples, the target SOC may be 60%, 65%, 75%, 85%, or 95% of the maximum SOC. It will be appreciated that the total charge capacity of the battery may decrease (degrade) over time, and that the maximum SOC is considered to be 100% of whatever that total charge capacity may be at a given time in the life of the battery.

The historical SOC of the battery over time may affect the rate of degradation of the battery measured, e.g., in terms of the battery's ability to accept and hold a charge. Battery performance generally degrades over time. As a battery gets older, its capacity to hold charge may decrease (there may be a decrease over time in the maximum charge holding capacity attainable), and the battery may discharge faster even when not in power train use. In addition to the SOC of the battery, other factors may influence the rate of degradation of the battery. For example, the speed of charging, temperature of the battery, and usage habits can influence the rate of battery degradation. To decrease the rate of degradation of the battery over time, it may be desirable to control the SOC of the battery so as to limit the amount of time spent at the maximum SOC or other high SOC. For instance, it may be desirable to charge the vehicle battery 110 on a regular basis to only 60%, 65% or 70% of the maximum SOC and purposefully avoid charging the battery to a maximum SOC or other high SOC.

In step 230, the computer system 150, 160 and/or 117 receives a signal that the battery is coupled to charging circuitry 140 and available for charging, and a charging scheme for the battery is determined. Detection that the battery is coupled to charging circuitry can be accomplished by vehicle charging circuitry 113 of electrical power for charging via any suitable electrical detection circuit that senses the presence of electrical charging power. Such detection can also be done with a suitable switch, e.g., a switch at the charging receptacle on the vehicle that detects the plugging in of the charging cable 130. Upon such detection, the charging circuitry 140 and/or the vehicle charging circuitry 113 can generate a suitable signal to be received and processed by computer systems 160 and/or 117 and communicated to computer system 150, which may then also receive such a signal that the battery is coupled to charging circuitry and available for charging.

In this regard, the charging scheme may be calculated by a computer system 150, 160, and/or 117, e.g., using predetermined functional forms with variables determined through optimization calculations or may be selected from among multiple predetermined (precalculated) schemes based on rules-based selection criteria applied to the battery usage metrics and/or other vehicle usage metrics, for example, as will be discussed further herein. The charging scheme for the battery is a function of time and may be calculated to achieve a target SOC (e.g., 70% of maximum SOC or other calculated percentage of the maximum SOC) for the battery at the end of a predetermined time period, e.g., at which time driving is intended to commence. The SOC for the battery at any given time may be determined using any conventional charge detection circuitry, e.g., at the vehicle 100, such circuitry and functionality being known and based on, e.g., battery voltage measurements and/or current measurements (including, e.g., integration over time of charging current and discharge current), as well as associated analytical functionality in the form of software, firmware, or both for converting such measurements into state of charge determinations.

The charging scheme is a plan for the application of specified current and/or specified voltage as a function of time to charge the battery pack 110, and results in a desired SOC for the battery pack 110 as a function of time including a target SOC at a predetermined end time of a charging event. According to the present disclosure, exemplary charging schemes may be applied to control the time delivery of charging in ways consistent with present electrical requirements of existing batteries and associated electrical requirements of existing charging circuitry. Existing batteries for electric vehicles may require charging at certain currents (e.g., constant current) or certain voltages (e.g., constant voltage) in specified ranges, or combinations thereof, to avoid battery damage, and existing charging circuitry in the industry is presently configured to satisfy those requirements. For example, for certain existing batteries for electric vehicles, the charging current and charging voltage should be maintained within certain narrow ranges and not exceed certain values in order to prevent damage to the battery. According to the present disclosure, to achieve delivery of desired rates or amounts of charge as a function of time during a charging event, and to achieve desired SOC at the end of a charging event, approaches described herein provide for delivering desired currents and/or voltages (including those within constrained ranges based on existing physical, electrical and chemical requirements of conventional batteries) appropriately controlled in time, e.g., by controlling one or more start and stop times, duty cycles, and or pulsed application of current and voltage. Additionally, the approaches described herein are not limited to existing battery requirements and charging circuitry requirements arising from existing physical, chemical and electrical constraints of conventional batteries. As battery technology advances and as existing constraints are relaxed, the approaches described herein may be applied to new battery technology and charging circuitry as well.

Exemplary charging schemes may include a first time period and a second time period, the second time period beginning after the end of the first time period, for which an average rate of delivering charge to the battery during the second time period is greater than an average rate of delivering charge to the battery during the first time period. The average rate of delivering charge can be non-zero in the first time period and non-zero in the second time period. The first time period and the second time period need not be specific predetermined time periods determined by or programmed into one or more of the computer systems 150, 160, and 117, although they may be such. The first and second time periods may be viewed as convenient constructs for explaining the delayed charging aspect of exemplary approaches described herein that can reduce or minimize the average SOC of the battery during the charging process. In these regards, the first time period and the second time period may be the same in duration, approximately, e.g., 1 hour or less, 1 hour or more, ½-1 hour, 1-2 hours, 1-3 hours, 1-4 hours, 2 hours or less, 2 hours or more, 2-3 hours, 2-4 hours, 3 hours or less, 3 hours or more, 3-4 hours, 4 hours or less, 4 hours or more, etc., or the first and second time periods may be of different durations from among the preceding examples or other durations.

Figure 4:
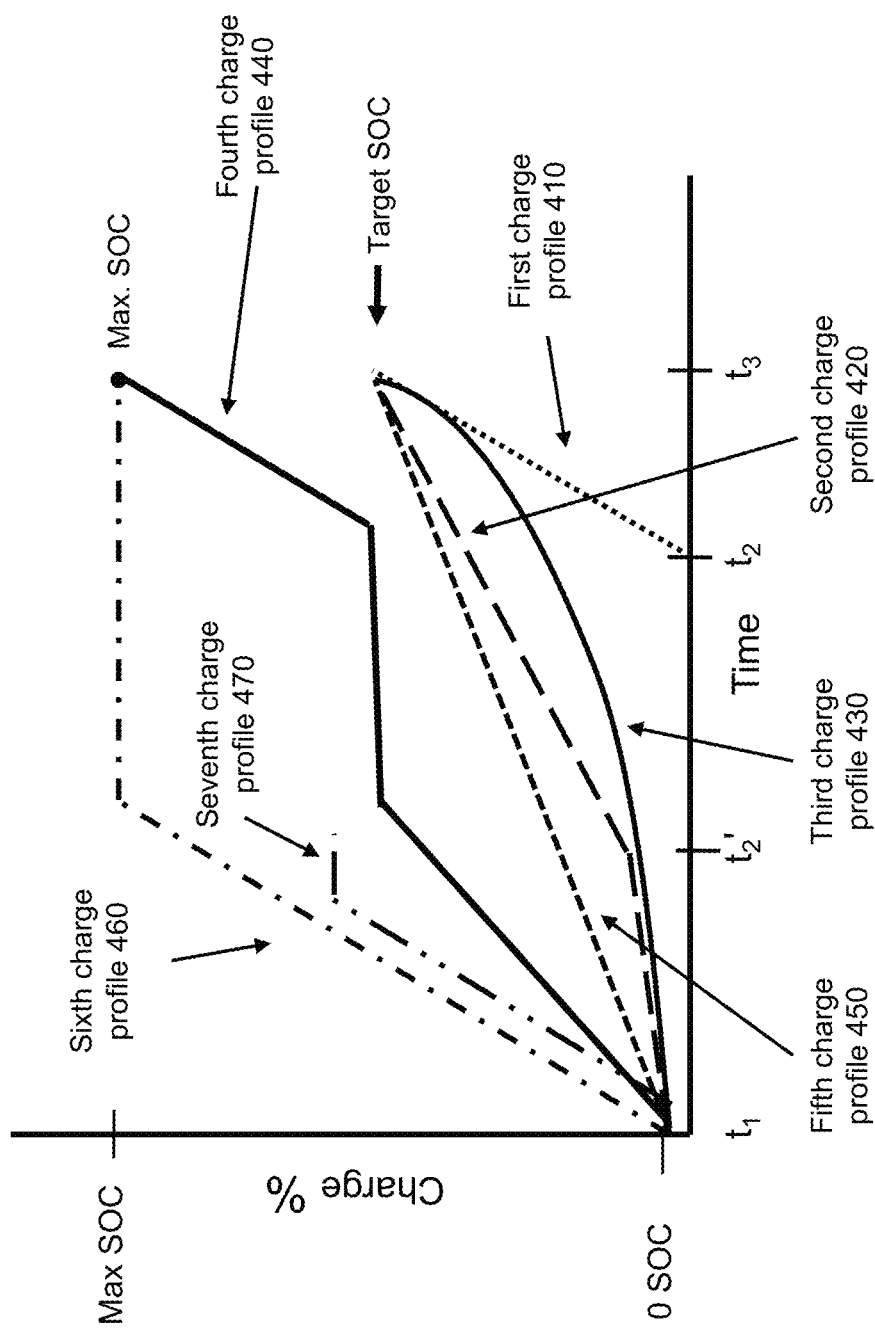
FIG. 4 is a graph illustrating several exemplary charge profiles for a battery resulting from exemplary charging schemes according to examples of the disclosure.

FIG. 4 discussed later herein illustrates several examples of charge profiles of the battery 100 as a function of time resulting from exemplary charging schemes. Exemplary charging schemes for the battery 110 that provide such charge profiles may be based on one or more of: (1) average historical SOC for the battery (e.g., averaged to include both use times and quiescent, non-use times) prior to identified departure and return times from and to the residence on work days (the predictable work commute), (2) average and mode values of charge used on work days, (3) an electricity cost profile as a function of time (e.g., where peak and non-peak rates, or preferred and non-preferred rates, are applicable on a daily basis), (4) a depreciation profile of the battery, (5) battery charging characteristics (e.g., how quickly the battery accepts a charge), (6) the opportunity cost of not having the vehicle ready for use, and (7) utilization costs of other infrastructure.

The depreciation profile of a battery is a measure of the loss in value of the battery as a function of time, including future projections to end-of-life, and may be specified (assumed) to be a default function that is the same for batteries of a same type (e.g., and used in vehicles of a same type), or it may be particular to a specific battery and evaluated (e.g., calculated, modeled) based on a particular battery's usage and charging history. For example, the depreciation profile of the battery may be treated as a constant loss in battery value per year based on the initial cost of the battery (e.g., $25,000.00) divided by the average lifetime of similar batteries under similar usage such as private commuter usage (e.g., an assumed or statistically determined life of 8 years). In other examples, the depreciation profile can be based on particular lifetime expectations of a particular battery, which can be determined based upon a specific battery-lifetime model. For example, a battery-lifetime model may comprise a linear combination (or other combination) of weighted features determined to be significant in trial-and-error analysis of lifetime data of similar batteries based on various types of battery usage, and the weights of the features can be determined (to calibrate the model) by fitting the model to aggregated reference data for many batteries. Particular usage data associated with a specific battery may then be inserted into the calibrated model to yield a particular lifetime prediction for the specific battery 110 (e.g., 10.5 years), and the depreciation profile in terms of value lost per year may be calculated as the initial battery value divided by the predicted lifetime in years.

The charging scheme can be calculated or otherwise determined to provide an advantageous overall cost benefit that accounts for the potential battery-degradation cost associated with having elevated SOC for an extended time and that accounts for the potential battery-degradation cost associated with charging the battery at a high charging rate. These factors may be aspects of the depreciation profile referred to above. In other words, to promote battery life, it can be desirable to both minimize the amount of time that the battery experiences an elevated SOC and avoid high (fast) charging rates. These factors also may be considered competing factors, because use of high charging rates (which may cause more battery degradation compared to lower charging rates) may provide a benefit of reducing the amount of time the battery 110 experiences elevated SOC, and vice versa. As another example, it may be beneficial from an overall standpoint to charge the battery at higher electricity rates during times when the environment is cooler so that lower temperature of the environment provides some cooling to the battery during charging. In this way, the battery may experience relatively lower temperatures during charging since the temperature increase in the battery due to heating from charging will be lower than it otherwise would be if charged in a warmer environment. Elevated battery temperatures during charging can be a significant factor in battery degradation, and charging at higher electricity rates, which is counter to the conventional wisdom, may be beneficial overall when done at cooler environmental temperatures where the cost benefit of avoiding degradation due to elevated temperature outweighs the additional cost of electricity at the higher electricity cost rate. In this regard, the monitoring/processing system 170 may monitor not only existing environmental conditions proximate to the location of the vehicle 100, e.g., through sensors at the vehicle or sensors accessible near the vehicle's location determined by GPS for instance (e.g., temperature sensors, humidity sensors, etc.), but may also monitor weather forecasts for making prospective decisions regarding selecting a charging scheme based on the expected environmental conditions for the vehicle's location.

For a given battery 110 or type of battery 110, which of these competing factors has a relatively greater impact in terms of cost per mile may depend on the past usage history and past charging history of the battery 110, exemplary metrics for which are mentioned below and elsewhere herein. Numerical values, e.g., in terms of cost per mile of battery-degradation due to elevated SOC and high charging rate will depend on the circumstances at hand and can be determined by analyzing actual battery lifetime data for a collection of reference batteries based on actual charging data and actual usage data (and associated metrics such as described below and elsewhere herein) for those batteries or through other numerical and/or analytical modeling. Additionally, the charging scheme may also take into account the varying cost for electricity available for charging at different times in a time period in which the vehicle is available for charging in addition to addressing the battery-degradation cost factors noted above. Other factors may include the opportunity cost of not having the vehicle ready for use, and utilization costs of other infrastructure. Depending on the varying cost per mile of electricity available at different times for charging, the cost per mile of battery degradation based on elevated SOC, and the cost per mile of battery degradation based on high charging rates, the charging scheme may provide an overall cost preference for one possible charging scheme over another possible charging scheme. For example, there may be a cost preference for a charging scheme for charging a battery during the available charging period at a relatively faster charging rate closer to intended departure time at a higher electricity cost rate to minimize the time at elevated SOC instead of charging the battery earlier in the available time period at a slower charging rate and lower electricity cost rate that would result in a longer time at elevated SOC.

As noted above the battery-degradation cost associated with maintaining a battery at elevated SOC for an extended period and the battery-degradation cost associated with charging the battery at high charging rates may depend on a variety of factors including past battery usage behavior, past battery charging behavior, and past vehicle usage behavior. Such factors, which may be pertinent to a depreciation profile for the battery as noted above, may more specifically include, for example, the historical average state of charge of the battery, the amount (or percentage) of time the battery has spent at maximum SOC (or at or above 85% SOC, 90% SOC, 95% SOC), statistical data regarding discharge rates experienced by the battery (e.g., maximum, median, mode, and average discharge rates over a time period including cumulative time to date), average temperature that the battery 110 has experienced (e.g., as measured by one or more temperature sensors at the battery 110), average and cumulative time (or percentage of time to date) the battery 110 has experienced a temperature at or below a predetermined low-temperature threshold (e.g., 32° F.), average and cumulative time (or percentage of time to date) the battery 110 has experienced a temperature at or above a predetermined high-temperature threshold (e.g., 100° F.), and the like. As noted above, numerical values in terms of cost per mile of battery-degradation due to elevated SOC and battery degradation to elevated charging rate will depend on the circumstances at hand and can be determined by analyzing actual battery lifetime data for a collection of reference batteries based on actual charging data and actual usage data (and associated metrics such as described below and elsewhere herein) for those batteries or through other numerical and/or analytical modeling.

As an example, consider a vehicle with a 50 kWh battery presently at 20% of maximum SOC that must be at 70% of maximum SOC in 10 hours (i.e., 25 kWh of energy must be delivered to the battery by the end of 10 hours), and assume that the battery would cost $10,000 to replace in today's dollars. If analytics, e.g., based on statistical analysis of many batteries and/or computer modeling and based on battery usage metrics of the specific battery of the specific vehicle under consideration, predict that the capacity of the battery would be reduced by an additional 0.005% if charged now so as to reach 70% of maximum SOC in 5 hours and remain at 70% SOC for the following 5 hours (i.e., the battery is maintained at 70% SOC for 5 hours following the initial 5-hour charge), as opposed to waiting 5 hours to charge, the value of the battery reduction could be minimized by $0.50 by delaying the charging by 5 hours so as to charge during the final 5 hours. Consider projected rates of electricity of $0.10/kWh for the first 5 hours and $0.11/kWh for the final 5 hours of the 10 hour period. The computer system 150 could calculate that the cost to charge in the first 5 hours is $3.00 (25 kWh*$0.10/kWh+$0.50 additional loss of battery value) and the cost to charge at the later time is $2.75 (25 kWh*$0.11). Based on such an analytics model (computer model), the computer system 150 could choose a charging scheme that delays charging because it is less expensive overall when considering the impact of maintaining elevated SOC given historical battery usage metrics and analytics/computer modeling that account for SOC impact. This is contrary to conventional wisdom which assumes charging at the lower electricity cost rate is the preferred option.

As another example, consider a vehicle with a 50 kWh battery presently at 0% SOC that must be 100% full in 10 hours (i.e., 50 kWh of energy must be delivered to the battery), and assume that the battery would cost $10,000 to replace in today's dollars. If analytics, e.g., based on statistical analysis of many batteries and/or computer modeling and based on battery usage metrics of the specific battery of the specific vehicle under consideration, predict that the capacity of the battery would be reduced by an additional 0.015% if charged now at the current temperature as opposed to waiting 5 hours to charge at a lower environmental temperature, the value of the battery reduction could be minimized by $1.50 ($10,000*0.015%) by delaying the charging 5 hours so as to charge at the lower environmental temperature. Consider projected rates of electricity of $0.10/kWh for the first 5 hours and $0.12/kWh for the following 5 hours. The computer system 150 could calculate that the cost to charge now to provide 50 kWh of energy (10 kW for 5 hours) at the high environmental temperature is $6.50 (50 kWh*$0.10+$1.50 additional loss of battery value) and the cost to charge at the later time is $6.00 (50 kWh*$0.15). Based on such an analytics model (computer model), the computer system 150 could choose a charging scheme that delays charging. This is contrary to conventional wisdom which assumes charging at the lower electricity cost rate is the preferred option.

It should be appreciated that the examples above present potential outcomes that depend on underlying computer-based analytics and/or computer modeling that may be updated in on an ongoing basis, e.g., weekly, daily, hourly, every 10 minutes or 5 minutes, minute-by-minute, or essentially in real time, based on monitoring battery usage metrics and battery performance metrics for many batteries of many vehicles being monitored via wired and wireless communication (e.g., a fleet of vehicles such as autonomous vehicles, vehicles of a vehicle sharing platform, or a collection of vehicles under service contract by a service provider) as well as battery usage metrics and battery performance metrics for the specific battery of the specific vehicle under consideration being monitored. The amount of data being analyzed on an ongoing basis may be vast, and computerized analytics and/or modeling are required to process the data and update analytics and metrics quickly (e.g., on time frames noted above) so as to provide actionable information from which to calculate and choose charging schemes for electric vehicles as described herein as may be needed at a given time.

In step 240, the battery is charged according to the charging scheme under control of computer system 150, 160, and/or 117 until the battery reaches the target state of charge. As noted at step 250, the battery charging at step 240 may comprise charging the battery during a time period in which a first, lower electricity cost rate and a second, higher electricity cost rate are applicable at different times, wherein the first electricity cost rate is lower than the second electricity cost rate, and may comprise charging the battery at the second, higher electricity cost rate and refraining from charging the battery at the first, lower electricity cost rate for at least some time. Such an approach may provide an overall cost benefit for combined electricity costs and battery degradation costs overall as explained herein. In some examples, an average state of charge of the battery over a time period (e.g., cumulative time in service) may be calculated, and the calculated charging scheme may be based, at least in part, on the average state of charge.

Figure 3:
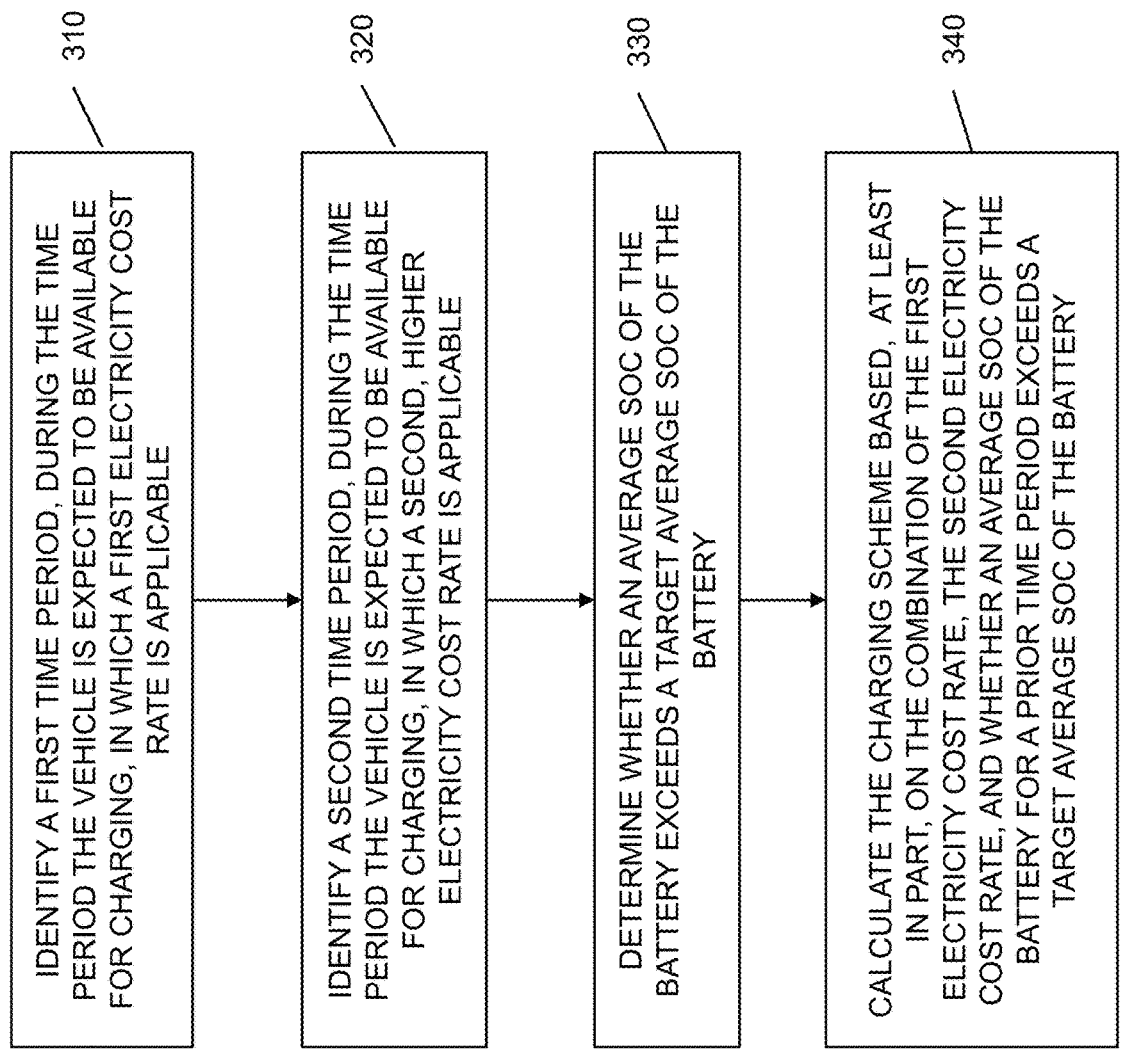
FIG. 3 is a flow chart of an exemplary approach for determining, e.g., calculating/selecting a charging scheme for charging a battery of an electric vehicle according to an example of the disclosure where different electricity costs rates are available during a period available for charging.

FIG. 3 is a flow chart of an exemplary approach for calculating a charging scheme and charging a battery of an electric vehicle according to an example of the disclosure. At step 310, a first time period corresponding to at least a portion of the time period during which the vehicle is expected to be available for charging is identified. A first electricity cost rate may be applicable to the first time period—in other words, during the first time period, the cost of electricity may be a first cost rate. At step 320, a second time period corresponding to at least a portion of the time period during which the vehicle is expected to be available for charging is identified. The second time period is different than the first time period and begins after the end of the first time period. A second electricity cost rate may be applicable to the second time period, and the second electricity cost rate may be higher than the first electricity cost rate. That is, it may be more expensive to use electricity during the second time period than during the first time period. At step 330, a determination is made as to whether or not an average state of charge of the battery for a time period (e.g., time in service from inception to present) exceeds a target average state of charge of the battery. At step 340, the charging scheme within the first time period and second time period is calculated based at least in part on the combination of the first electricity cost rate, the second electricity cost rate, the time period during which the vehicle is expected to be available for charging, and whether the average state of charge of the battery exceeds a target average state of charge of the battery as discussed herein.

FIG. 4 is a graph illustrating seven exemplary different charge profiles for a battery 110 resulting from exemplary charging schemes according to examples of the disclosure. In various examples, it is desired to achieve a certain SOC by time $t_3$, e.g., at which time the vehicle may be needed to provide transportation. The graph assumes the vehicle 100 is available to be charged between times $t_1$ and $t_3$. In some examples described herein, electricity has a first cost rate during a first time period, e.g., between times $t_1$ and $t_2$ or between times $t_1$ and $t_2'$, and electricity has a second cost rate during a second time period, e.g., between times $t_2$ and $t_3$ or between times $t_2'$ and $t_3$, depending on the example. As discussed above, in some examples, the cost of electricity in the first time period may be less expensive than the cost of electricity in the second time period. The profiles (curves) illustrated in FIG. 4 are intended to be qualitative and approximate for purposes of illustrating alternative charge states that may be experienced by the battery 110 under different exemplary charging schemes. In this regard it should be understood that the exemplary charge profiles illustrated in FIG. 4 are different than the charging schemes themselves, which involve the application of desired currents and voltages to the battery 110 as a function of time. That is, the exemplary curves (charge profiles) in FIG. 4 represent the SOC experienced by the battery 110 resulting from different exemplary charging schemes.

A first exemplary charge profile is shown as charge profile 410 in FIG. 4. In this charge profile, charging is delayed until a time $t_2$ at which time a high charging rate is applied to the battery until it reaches a target SOC at time $t_3$, which may be a predetermined target time for the vehicle 100 to be used for a driving event (e.g., to achieve the desired charge by 7 AM for the morning commute to work). Thus, in some examples, the computer system 150, 160 and/or 117 executing an algorithm for determining a charging scheme based on analytics and historical vehicle usage as described previously may calculate the amount of time required to charge the battery to the target SOC by applying a high, e.g., maximum available, charging capability and then control the charging circuitry 140 to start charging at the appropriate onset time so as to complete charging the battery at a target time $t_3$. Charge profile 410 may be desirable because it achieves a target SOC less than a maximum SOC and minimizes/reduces the amount of time that the battery is maintained at the target SOC, and may thereby improve battery life as explained previously.

The charging scheme for this charge profile may be more expensive in terms of immediate electricity costs since the electricity cost associated with charging the battery may be more expensive during the second time period $t_2$-$t_3$ (i.e., between $t_2$ and $t_3$) where the charging is occurring. In other words, in this example, the computer system 150, 160 and/or 117 controls charging so as to purposefully refrain from charging the battery 110 at the first lower electricity cost rate during the first time period $t_1$-$t_2$ and instead charges the battery at the second higher electricity cost rate during the second time period $t_2$-$t_3$, at least for some time. In this example, even though the cost of electricity in the first time period is less than the cost of electricity in the second time period, more charging is occurring in the second time period, contrary to conventional wisdom. As shown by charge profile 410, the average rate of delivering charge to the battery during the second time period is greater than an average rate of delivering charge to the battery during the first time period (which is zero for the first time period in this example), and the amount of electric energy (or charge) delivered to the battery during the second time period is greater than the amount of electric energy (or charge) delivered to the battery during the first time period (which is zero in the first time period in this example).

In the second exemplary charge profile 420, the battery 110 experiences a varying charging rate that varies, e.g., increases with time. Exemplary charge profile 420 may achieve an advantageous balance of 1) the electricity cost of charging during the first time period (between $t_1$ and $t_2'$), 2) the electricity cost of charging during a second time period (between $t_2'$ and $t_3$), 3) the cost associated with battery degradation due to maintaining an elevated SOC for an extended time, and 4) the cost associated with battery degradation due to high charging rates. In charge profile 420 as illustrated in the example in FIG. 4, some charge is applied to the battery during a first time period ($t_1$-$t_2'$) at a relatively lower charging rate, and a second amount of charge is applied to the battery 110 during a second time period ($t_2'$-$t_3$) at a relatively higher charging rate, so as to obtain the target SOC for the battery at the predetermined target time $t_3$. This may be accomplished with a charging scheme that increases the charging current at time $t_2$ so as to achieve the desired varying charging rates during the time period $t_1$-$t_3$ to achieve the target SOC at predetermined target time $t_3$.

The computer system 150, 160 and/or 117 executing an algorithm for determining a charging scheme based on analytics and historical vehicle usage may determine how much time the vehicle is available for charging and then, based on the analytics and vehicle metrics as discussed previously, calculate a charging scheme that applies a suitable applied current and voltage so as to achieve the desired SOC within the time period $t_1$-$t_3$, i.e., so as to achieve the target SOC at predetermined target time $t_3$. In this example, even though the cost of electricity in the first time period is less than the cost of electricity in the second time period, more charging is occurring in the second time period, contrary to conventional wisdom. As shown by charge profile 420, the average rate of delivering charge to the battery during the second time period is greater than an average rate of delivering charge to the battery during the first time period, and the amount of electric energy (or charge) delivered to the battery during the second time period is greater than amount of electric energy (or charge) delivered to the battery during the first time period.

In the third exemplary charge profile 430 in FIG. 4, the battery 110 experiences a varying charging rate that varies, e.g., increases with time. Exemplary charge profile 430 may achieve an advantageous balance of 1) the electricity cost of charging during the first time period (between $t_1$ and $t_2$), 2) the electricity cost of charging during a second time period (between $t_2$ and $t_3$), 3) the cost associated with battery degradation due to maintaining an elevated SOC for an extended time, and 4) the cost associated with battery degradation due to high charging rates. In charge profile 450 as illustrated in the example in FIG. 4, some charge is applied to the battery during a first time period ($t_1$-$t_2$) at relatively lower (slower) charging rates, and a second (larger) amount of charge is applied to the battery 110 during the second time period ($t_2$-$t_3$) at relatively higher (faster) charging rates, so as to obtain the target SOC for the battery at the predetermined target time $t_3$. This may be accomplished with a charging scheme increases the charging current with time so as to achieve the desired varying charging rates during the time period $t_1$-$t_3$ to achieve the target SOC at predetermined target time $t_3$.

The computer system 150, 160 and/or 117 executing an algorithm for determining a charging scheme based on analytics and historical vehicle usage may determine how much time the vehicle is available for charging and then, based on the analytics and vehicle metrics as discussed previously, calculate a charging scheme that applies a suitable applied current and voltage so as to achieve the desired SOC within the time period $t_1$-$t_3$, i.e., so as to achieve the target SOC at predetermined target time $t_3$. In this example, even though the cost of electricity in the first time period is less than the cost of electricity in the second time period, more charging is occurring in the second time period, contrary to conventional wisdom. As shown by charge profile 430, the average rate of delivering charge to the battery during the second time period is greater than an average rate of delivering charge to the battery during the first time period, and the amount of electric energy (or charge) delivered to the battery during the second time period is greater than amount of electric energy (or charge) delivered to the battery during the first time period.

In the fourth exemplary charge profile 440 in FIG. 4, the battery 110 experiences a varying charging rate that varies, e.g., increases with time, in a different manner. In charge profile 440 as illustrated in the example in FIG. 4, a high charging rate is applied to the battery during a first charging time period ($t_1$-$t_2'$) so that the battery reaches a first target SOC at time $t_2'$. In time period ($t_2'$-$t_2$), charging is suspended such that the SOC is maintained at the first target SOC until time $t_2$. During a second charging time period ($t_2$-$t_3$), a second, e.g., higher, charging rate is applied in order to charge the battery to a maximum SOC. In this example, charging during a first time period ($t_1$-$t_2'$) could occur for instance during daytime hours, and the subsequent non-charging period ($t_2'$-$t_2$) could occur during nighttime hours. Heating of the battery that occurs with charging during the first time period can be dissipated during the non-charging period ($t_2'$-$t_2$), e.g., when the environment is cooler. In other words, the battery can be permitted to cool off at night before continuing charging during the second charging period time ($t_2'$-$t_3$), and this approach may reduce battery degradation by avoiding maintaining the battery at elevated temperature for an extended time period. The second charging period time ($t_2'$-$t_3$) brings the battery to a maximum SOC for maximum distance usage.

The computer system 150, 160 and/or 117 executing an algorithm for determining a charging scheme based on analytics and historical vehicle usage may determine how much time the vehicle is available for charging and then, based on the analytics and vehicle metrics as discussed previously, calculate a charging scheme that applies a suitable applied current and voltage so as to achieve the desired SOC within the time period $t_1$-$t_3$, i.e., so as to achieve the target SOC at predetermined target time $t_3$. As shown in this example, the analytics processed by the computer may include those that assess pertinent environmental data applicable to the vehicle's geographic location. As shown by charge profile 440, the average rate of delivering charge to the battery during the second time period is greater than an average rate of delivering charge to the battery during the first time period, and the amount of electric energy (or charge) delivered to the battery during the second time period is greater than amount of electric energy (or charge) delivered to the battery during the first time period.

In the first, second, third and fourth examples, even though the cost of electricity in the first time period is less than the cost of electricity in the second time period, more charging is occurring in the second time period, contrary to conventional wisdom. However, this approach can yield overall lower battery costs when considering both the cost of electricity and the cost of battery degradation over time, because even though more charging occurs at higher electricity cost rates, the charging profile provides a reduced average state of charge that prolongs battery life. In other words, during the first time period, the low cost of electricity compared to that in the second time period is outweighed by the cost benefit of having a lower average state of charge that facilitates avoiding the cost of battery degradation (which would otherwise occur by repetitive early onset charging and maintaining the battery at a higher state of charge for a longer time). In the second time period, a relatively higher charge rate is applied to the battery because the reduced degradation of the battery outweighs the cost of electricity during the second time period. In other words, the charge rate is selected to vary as a function of time so as to reduce (or minimize) the sum of the cost of charging (e.g., electricity) and the cost of battery degradation. In some instances, it may be desirable to pay more for electricity at higher cost rates for charging even if lower cost electricity would be available at earlier (off rate) times, to reduce battery degradation, depending upon the historical performance and historical state of charge of the battery 110. In other instances it may be desirable to pay less for electricity if low electricity cost rates are available notwithstanding the competing degradation costs (over time) of battery degradation by maintaining a higher average state of charge, if the lower electricity cost outweighs the cost impact of battery degradation.

In the fifth exemplary charge profile 450 in FIG. 4, the battery 110 experiences an approximately constant charge rate and obtains a target SOC less than a maximum SOC in the time period $t_1$-$t_3$. The computer system 150, 160 and/or 117 executing an algorithm for determining a charging scheme based on analytics and historical vehicle usage may determine how much time the vehicle is available for charging and then, based on the analytics and vehicle metrics as discussed previously, calculate a charging scheme that applies a suitable applied current and voltage so as to achieve the desired SOC within the time period $t_1$-$t_3$, i.e., so as to achieve the target SOC at predetermined target time $t_3$. Charge profile 450 may be desirable where the cost of battery degradation that would otherwise occur at a maximum charging rate and the cost savings associated with a lower electricity cost rate in time period $t_1$-$t_3$ outweigh the alternative cost of battery degradation expected to occur from maintaining a higher average SOC for a longer time with the profile 440. As can be seen from FIG. 4, the average SOC for profile 440 is reduced relative to charge profiles 410 and 420, and the battery 110 has some SOC available at earlier times compared to charge profile 430. In this example, even though the cost of electricity in the first time period is less than the cost of electricity in the second time period, more charging is occurring in the second time period, contrary to conventional wisdom.

In FIG. 4, the sixth charge profile 460 illustrates a scenario in which a high charge rate is experienced by the battery 110 until the state of charge of the battery reaches a maximum SOC (at time $t_2'$) after which the battery is maintained at the maximum state of charge. Charge profile 460 may be desirable in situations where a maximum state of charge is desirable regardless of time. In addition, this charge profile may be beneficial to minimize or reduce the electricity cost associated with charging the battery since the cost of electricity may be less expensive during a period $t_1$-$t_2$' (between $t_1$ and $t_2$') where the charging is occurring. The computer system 150, 160 and/or 117 executing an algorithm for determining a charging scheme based on analytics and historical vehicle usage may apply this charging scheme when information is unavailable regarding how long the vehicle 100 may be available for charging or when the vehicle 100 may be needed for a driving event. However, this charge profile maintains the battery at a relatively high average SOC, which may have a detrimental effect of battery degradation over time.

A seventh charge profile 470 is also shown in FIG. 4, and in this example, the battery 110 also experiences a high charging rate. For clarity, this exemplary profile 470 is shown in FIG. 4 as shifted slightly to the right of charge profile 460, but it may also be applied so as to start at time $t_1$. In the example of charging profile 470, a high charging rate is experienced for a period of time that provides an intermediate SOC that is less than a maximum SOC, and then charging stops. Charge profile 470 may occur when it is desired to charge a battery quickly, and then charging is stopped when the vehicle is needed for transportation, even though less than maximum SOC has been achieved. For example, the computer system 150, 160 and/or 117 executing an algorithm for determining a charging scheme based on analytics and historical vehicle usage may apply this charging scheme with high charging rate at onset when information is unavailable regarding how long the vehicle 100 may be available for charging or when the vehicle 100 may be needed for a driving event, and charging may be terminated when the vehicle is needed for transportation.

An exemplary charging scheme will now be described with reference to FIG. 5. As explained above, the computer system 150, 160 and/or 117 executing an algorithm for determining a charging scheme based on analytics and historical vehicle usage may determine how much time the vehicle is available for charging and then, based on the analytics and vehicle metrics as discussed previously, calculate a charging scheme as a function of time that applies a suitable applied current and/or voltage so as to achieve the target SOC at a predetermined target time. In this regard, it should be noted that the exemplary charge profiles illustrated in FIG. 4 and described above which show SOC of the battery as a function of time are relatable to current, since the amount of charge moved in a time period corresponds to integral of current over that time period. Thus a suitable charging scheme for the fourth charge profile 440 shown in FIG. 4 is illustrated in FIG. 5 by the exemplary charging scheme 500.

Figure 5:
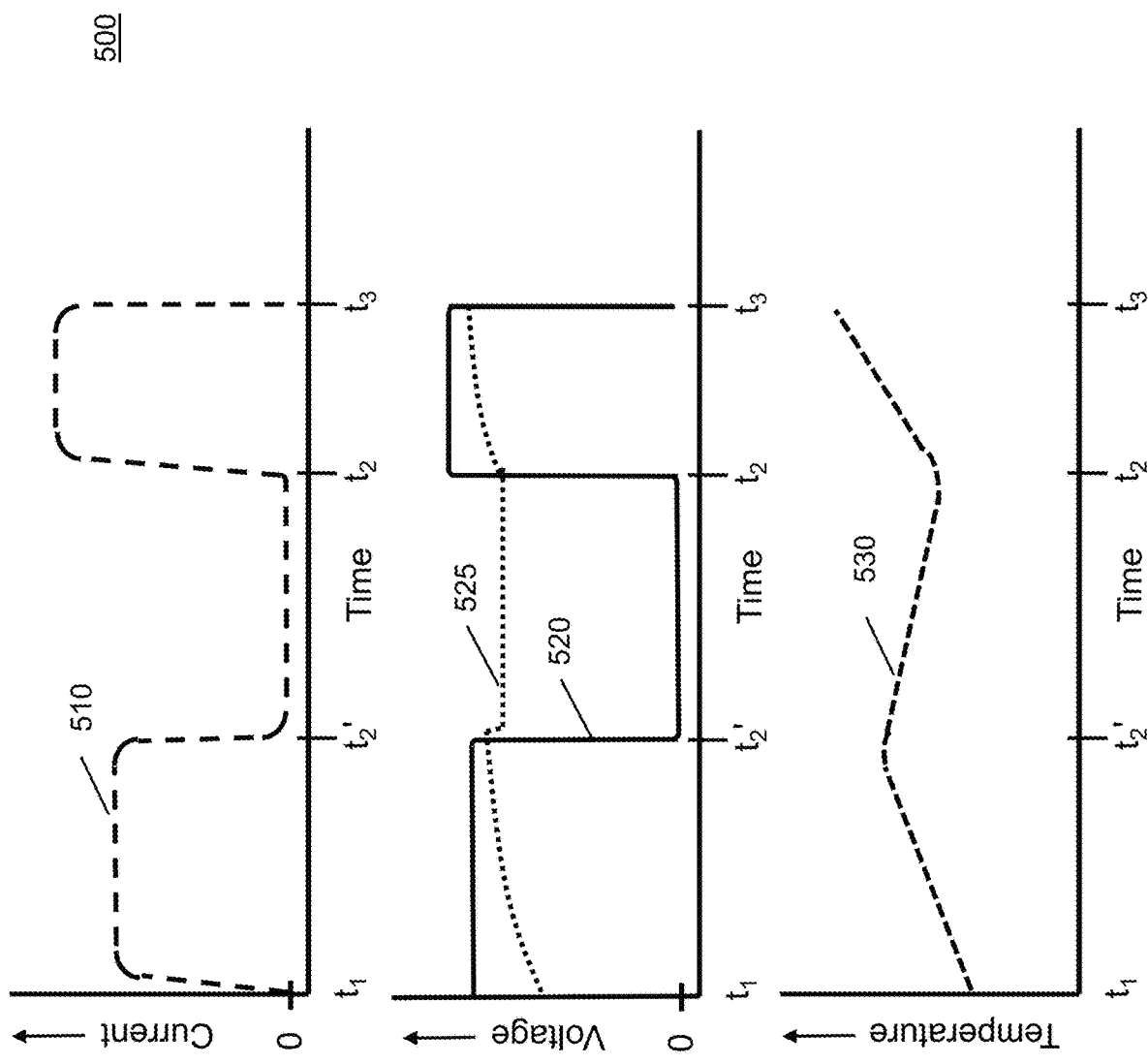
FIG. 5 is a graph illustrating an exemplary charging scheme according to an example of the disclosure.

As shown in FIG. 5, the exemplary charging scheme 500 includes an electrical applied current profile (curve) 510 and an electrical applied voltage profile (curve) 520. These curves should be understood to be qualitative and approximate for purposes of explanation with respect to the charge profile 440 of FIG. 4. During a first charging time period $t_1$-$t_2$', a voltage and current are applied to the battery, which results in an intermediate SOC for the battery at time $t_2$' as shown for charge profile 440 in FIG. 4. At time $t_2$' the applied current and applied voltage are decreased to zero as shown by current profile 510 and voltage profile 520 and remain at zero until time $t_2$. This corresponds to the region of flat SOC for the battery between times $t_2$' and $t_2$ of charge profile 440 in FIG. 4. During a second charging time period time $t_2$' and $t_3$, current and voltage are again applied to battery, which results in achieving maximum SOC for the batter at time $t_3$ as shown for charge profile 440 in FIG. 4. During this second time period a larger current is to be applied to the battery by the charging circuitry 140 than during the first time period $t_1$-$t_2$', as reflected by the higher charging rate illustrated during this same time period in the charge profile 440 in FIG. 4. Though not necessarily a component of the charging scheme, an illustration of the approximate change in battery temperature 530 (dashed line) associated with the charging scheme is also shown in FIG. 5. As shown by battery temperature profile 530, the battery temperature initially increases upon charging during the first time period, decreases somewhat during the subsequent non-charging period, and then increases again during the second charging period. Also shown is a resulting battery voltage curve 525 (dotted line), i.e., an approximate representation how a measurement of the battery voltage itself would appear. As shown in FIG. 5 by curved 525, the voltage of the battery (not the applied voltage) initially rises from a starting value to a higher intermediate value during the first charging time period, drops slightly and remains approximately constant during the non-charging period (when the applied voltage and applied current are reduced), and then rises during the second charging time period to a final higher voltage.

Figure 6:
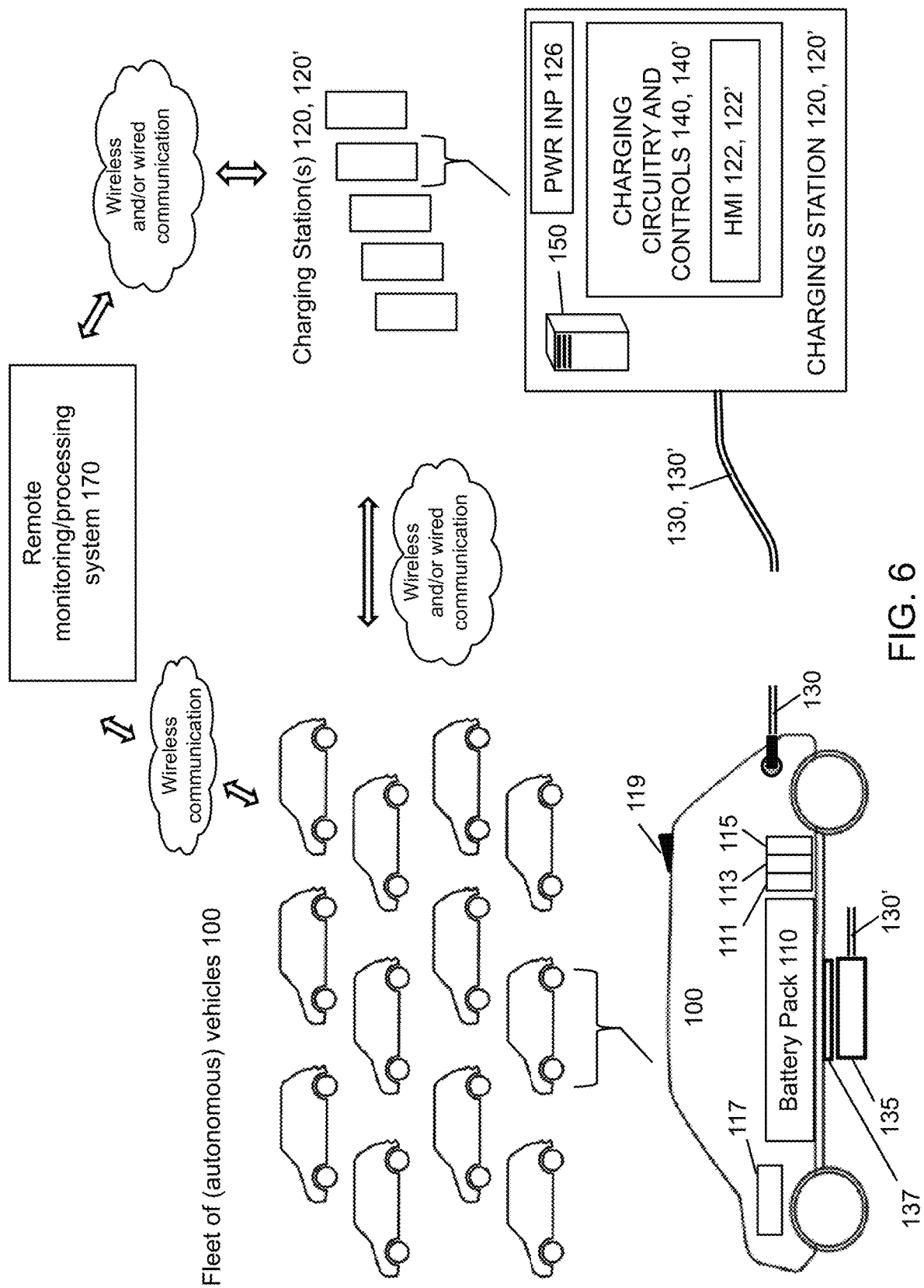
FIG. 6 illustrates another exemplary embodiment of a battery charging system for a fleet of electric vehicles according to an example of the disclosure.

FIG. 6 illustrates another exemplary embodiment of a battery charging system for a fleet of electric vehicles 100, e.g., autonomous vehicles (which drive without the need for human drivers), according to an example of the disclosure. In this example, a fleet of vehicles 100, e.g., autonomous vehicles, may be maintained, managed, dispatched, and charged at one or more physical terminals (e.g., buildings or spaces) located at one or more suitable geographic locations. The vehicles 100 may be charged by wireless charging, wired charging, or combination thereof. Multiple charging stations 120, 120' may be utilized such as described previously herein. Those charging stations 120, 120' may include charging circuitry and controls 140, 140' and HMIs 122, 122' such as described previously herein and may deliver power to vehicles 100 via cables 130 or cables 130' as appropriate, e.g., for coupling to a plug at the vehicle (for wired charging) or for driving an (emitting) induction coil 135 coupled to a (receiving) induction coil 137 at the vehicle (for wireless charging). The vehicles 100 of the fleet include transceivers for wireless communication with the remote monitoring/processing system 170 and/or the charging stations 120, 120' so as to permit communication with the computer system 150. The vehicles 100 may also communicate through wired communication via cables 130 as appropriate. The charging stations 120, 120' (and association computer systems 150) likewise may communicate with the remote monitoring/processing system 170 via wired or wireless communication. The use of wireless charging may be advantageous for a fleet of autonomous vehicles 100 since the vehicles autonomously may position themselves at wireless induction coils 135 for charging, guided by any suitable on-board telemetry functionality, localized position detecting sensors (e.g., RFID sensors, optical sensors, etc.), or combination thereof, without a need for physically plugging-in cables 130 to the vehicles 130 for wired charging.

The charging systems 120, 120' and associated computer systems 150, and/or the remote monitoring/processing system 170, and/or the onboard vehicle computer systems 117 may include functionality for obtaining data regarding past battery usage, past battery charging, diagnostic information regarding state of health of the battery packs 110 of the vehicles 100, and vehicle usage via wired or wireless communication from the vehicles 100, e.g., via wireless transceiver(s) 119, via cables 130, 130', or combination thereof. Each battery pack 110 may have its own unique identification, such as a unique identification (ID) number or other identification code that may be electronically and/or physically readable (e.g., may be tagged with a bar code, QPC code, or the like, as well as an electronic ID). Thus, for example, in the fleet of electric vehicles 100, each vehicle 100 may have its own unique vehicle identification number, and the battery pack 110 of each vehicle may have its own unique battery identification number (e.g., so as to be able to catalog battery history uniquely for each battery 110 even where batteries 110 may be exchanged among vehicles 100). For example, battery monitoring sensors in the form of electrical circuits at the vehicle 110 may monitor battery usage such as battery discharge rate as a function of time during both driving periods and quiescent periods and such as regenerative charging as a function of time during driving. Each vehicle 100 may also include a GPS unit for monitoring location, speed, and direction, accelerometers for measuring acceleration, deceleration and vibration, and various other suitable sensors for monitoring the health and status of other major systems of the vehicle and for detecting warning or fault conditions. Such data may be stored in onboard vehicle computer systems 117 with suitable memory and may be communicated to the remote monitoring system 170 and/or the computer systems 150. In an example, the remote monitoring system 170, and/or the computer systems 150, and/or the vehicle computer systems 117 may calculate metrics based on battery usage and vehicle usage, e.g., that may relate to degrees of demand placed on the batteries and/or other vehicle systems experienced by a particular vehicle 100 and particular battery 110, which may be utilized in determining a suitable charging scheme for a given battery 110. For example, for a vehicle 100 that experiences rapid acceleration, rapid deceleration, significant jarring vibration or impacts (e.g., due to poor road conditions), high battery charging or discharging rates, extended periods at elevated battery SOC, temperature extremes, and the like, the associated battery 110 may have a shorter predicted (e.g., calculated) lifetime, and metrics based on such information can be utilized to determine (e.g., calculate, select) a suitable charging scheme for each vehicle battery 110 as described above.

For a fleet of vehicles 100, it may be desirable to utilize multiple different charging schemes for different groups of vehicles 100. For example, for a first group of the vehicles 100, it may be desirable to charge vehicle batteries 110 to target SOCs less than maximum SOCs for the respective batteries 110 and to provide a majority of the charging close to expected departure times, as described elsewhere herein, in order to minimize battery degradation that might otherwise occur by maintaining those batteries 110 at elevated SOC for extended time periods. That is, the charging scheme for a first group of vehicles may include a first time period and a second time period, the second time period beginning after the end of the first time period, wherein according to the charging scheme an average rate of delivering charge to the battery during the second time period is greater than an average rate of delivering charge to the battery during the first time period. Also, for a second group of vehicles 100, it may be desirable to charge the vehicle batteries 110 to maximum SOC promptly upon return to the fleet terminal, e.g., at fast or maximum charging rates, so that such vehicles are prepared as quickly as possible for maximum-range use. The vehicles 100 of the second group with their unique identifications may be designated for charging schemes over their lifetimes that differ from the charging schemes for vehicles 100 of the first group. Alternatively, vehicles 100 may be "rotated" between the multiple groups of vehicles so as to incur different charging schemes selected from, e.g., (1) a delayed charging scheme that charges to less than maximum SOC and (2) a charging scheme that charges to maximum SOC upon return of the vehicle 100 to the terminal or other designated location.

In fleet situations, it may be desirable to consider the needs of the fleet and balance battery degradation and cost of charging along with the needs of the fleet of vehicles. For example, if the target state of charge of a given battery 110 is less than the maximum state of charge, the range of vehicle 100 using that battery 110 is reduced. While this may be acceptable for isolated consumer vehicles (e.g., an individual's personal vehicle) this may not be acceptable for an entire fleet of vehicles. Within the fleet, some vehicles may need a higher target state of charge than others depending upon the type of intended vehicle usage. Accordingly, in some examples, it may be desirable to maintain some vehicles within the fleet at a first target state of charge different from a second target state of charge. In this manner, some vehicles within the fleet may have better range capabilities than others. Accordingly, the cost of battery degradation may further need to be weighed against the usage needs of the fleet of vehicles.

Accordingly, in some examples, determining the charging scheme may be based, at least in part, on the combination of a first electricity cost rate, a second electricity cost rate, whether an average state of charge of the battery exceeds a target average state of charge of the battery, and battery usage metrics for the fleet of vehicles. In some instances, it may be desirable to determine the charging scheme for a given battery 110 in a given vehicle 100 based on current or projected charge states of batteries 110 for other vehicles 100 of the fleet of vehicles 100. For example, the target state of charge of a given battery 100 of a given vehicle 110 may be increased or decreased based on overall needs of the fleet of vehicles 100.

In some examples, the charge rate may include charging the battery at the second, higher electricity cost rate and refraining from charging the battery at the first, lower electricity cost rate. In some examples a majority of the charge may be applied to the battery during the second time period with the higher electricity cost rate.

In some examples, the charging rate within the second time period may be based, at least in part, on the combination of the first electricity cost rate, the second electricity cost rate, and whether an average state of charge of the battery exceeds a target average state of charge of the battery. In some examples, the charging rate of the battery may be based on a period of time the vehicle is expected to be available for charging.

In some examples, the charging rate may permit an average state of charge of the battery during the period the vehicle is charging to be less than a target average state of charge desired for the battery.

In some examples, the target state of charge may be determined based on a variety of factors including, for example, maintaining an average state of charge of the battery within a desired range over a period of time.

In some examples, the target state of charge may comprise a calculated required amount of charge and a buffer amount of charge, wherein the buffer provides extra charge beyond the required amount of charge expected to be needed/used, e.g., on a given day for a given type of usage. The buffer can provide the ability to undertake unexpected or untypical excursions with the vehicle 100 in addition to the predicted/ expected excursions. For example, a buffer amount of charge may comprise 5% or 10% of the maximum charge, although other amounts may be used.

In some examples, the systems and methods described herein may determine a current state of charge of the battery and begin charging the battery at a predefined charging rate and at a predetermined time if the initial state of charge of the battery is below a predefined threshold until that threshold charge is reached. When the threshold charge is reached, then the battery may be charged according to a calculated charging scheme designed to achieve the required charge state at a given time while minimizing the time that the battery experiences an elevated charge state as described elsewhere herein. In this manner, it is possible to charge the battery to a minimum level so that, for example, if the vehicle is needed unexpectedly and must be removed from the charging system 120, 120', the battery has a certain minimum/sufficient amount of charge, while still achieving the enhanced battery life benefits associated with minimizing the time spent at elevated charge states.

In some examples, the systems and methods described herein may permit overriding the calculated charging profile so as to charge the battery to the maximum state of charge or other state of charge at any desired time.

In some examples, the systems and methods described herein may determine a charging profile for a vehicle based on the number of vehicles 100 that are expected to be charged and the number of charging stations 120, 120' that are available.

As discussed above, the described systems and methods may have benefits over conventional approaches for utilization and batteries for electric vehicles, including better utilization of electric vehicles, lower costs of ownership and driving for owners and/or users of the electric vehicles, improved battery capacity performance, and improved life for the batteries of the electric vehicles.

This written description describes exemplary embodiments of the invention, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.).

It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes, but is not limited to, a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. In addition, as used in the description herein and throughout the claims that follow, the meaning of "about" and/or "approximately" refers to ±10% of the quantity indicated, unless otherwise indicated. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

While the present invention has been described in terms of exemplary embodiments, it will be understood by those skilled in the art that various modifications can be made thereto without departing from the scope of the invention as set forth in the claims.

What is claimed is:

1. A method of charging a battery for an electric vehicle, the method comprising:

obtaining battery usage metrics of the battery for the electric vehicle, the battery usage metrics being based upon past usage of the battery and past charging of the battery;

analyzing the battery usage metrics to determine a target state of charge for a first type of vehicle usage;

receiving a signal that the battery is coupled to charging circuitry and is available for charging;

determining a charging scheme for the battery as a function of time to achieve the target state of charge at a first predetermined time, wherein the charging scheme includes a first time period and a second time period, the second time period beginning after the end of the first time period, wherein according to the charging scheme an average rate of delivering charge to the battery during the second time period is greater than an average rate of delivering charge to the battery during the first time period;

determining the charging scheme based, at least in part, on the combination of a first electricity cost rate, a second electricity cost rate, and whether an average state of charge of the battery over a prior time period exceeds a target average state of charge of the battery; and controlling the charging circuitry for charging the battery according to the charging scheme until the battery reaches the target state of charge;

wherein the target state of charge is less than a maximum state of charge for the battery, wherein the first electricity cost rate and the second electricity cost rate are available for charging at different times during the first and second time periods, the second electricity cost rate being higher than the first electricity cost rate, and wherein determining the charging scheme comprises making a determination to charge the battery such that a majority of charge is applied to the battery at the second electricity cost rate.

2. The method of claim 1, wherein the battery usage metrics include a metric based on a past state of charge history for the battery over a prior period of time.

3. The method of claim 2, wherein the battery usage metrics include a metric based on a past charging rate history for the battery over the prior period of time.

4. The method of claim 1, wherein the charging scheme for the battery is further based on one or more of an electricity cost profile, a maximum available charging rate, battery temperature, ambient environmental temperature, and a cost depreciation profile of the battery.

5. The method of claim 1, wherein the first electricity cost rate and the second electricity cost rate are available for charging at different times during the first and second time periods, the first electricity cost rate being lower than the second electricity cost rate, the method comprising charging the battery at the second electricity cost rate and refraining from charging the battery at the first electricity cost rate.

6. The method of claim 1, further comprising:
analyzing the battery usage metrics to determine another target state of charge for a second type of vehicle usage, the second type of vehicle usage being different from the first type of vehicle usage; and
determining another charging scheme for the battery as a function of time to achieve the second target state of charge at a second predetermined time.

7. A method of charging a battery for an electric vehicle, the method comprising:
obtaining battery usage metrics of the battery for the electric vehicle, the battery usage metrics being based upon past usage of the battery and past charging of the battery;
analyzing the battery usage metrics to determine a target state of charge for a first type of vehicle usage;
receiving a signal that the battery is coupled to charging circuitry and is available for charging;
determining a charging scheme for the battery as a function of time to achieve the target state of charge at a first predetermined time, wherein the charging scheme includes a first time period and a second time period, the second time period beginning after the end of the first time period, wherein according to the charging scheme an average rate of delivering charge to the battery during the second time period is greater than an average rate of delivering charge to the battery during the first time period; and
controlling the charging circuitry for charging the battery according to the charging scheme until the battery reaches the target state of charge;
wherein the target state of charge is less than a maximum state of charge for the battery, and
wherein a first electricity cost rate and a second electricity cost rate are available for charging at different times during the first and second time periods, the second electricity cost rate being higher than the first electricity cost rate, and wherein determining the charging scheme comprises making a determination to charge the battery such that a majority of charge is applied to the battery at the second electricity cost rate, wherein the charging scheme as a function of time permits an average state of charge of the battery during the period of time the vehicle is charging to be less than a target average state of charge.

8. A method of charging a battery for an electric vehicle, the method comprising:
obtaining battery usage metrics of the battery for the electric vehicle, the battery usage metrics being based upon past usage of the battery and past charging of the battery;
analyzing the battery usage metrics to determine a target state of charge for a first type of vehicle usage;
receiving a signal that the battery is coupled to charging circuitry and is available for charging;
determining a charging scheme for the battery as a function of time to achieve the target state of charge at a first predetermined time, wherein the charging scheme includes a first time period and a second time period, the second time period beginning after the end of the first time period, wherein according to the charging scheme an average rate of delivering charge to the battery during the second time period is greater than an average rate of delivering charge to the battery during the first time period;
determining an initial state of charge of the battery; and
responsive to the initial state of charge of the battery being below a predetermined threshold, determining the charging scheme to include an initial phase for charging the battery during an initial time period to a predetermined state of charge prior to the first time period
controlling the charging circuitry for charging the battery according to the charging scheme until the battery reaches the target state of charge;
wherein the target state of charge is less than a maximum state of charge for the battery, and
wherein a first electricity cost rate and a second electricity cost rate are available for charging at different times during the first and second time periods, the second electricity cost rate being higher than the first electricity cost rate, and wherein determining the charging scheme comprises making a determination to charge the battery such that a majority of charge is applied to the battery at the second electricity cost rate.

9. A system for charging a battery of an electric vehicle, the system comprising:
a power-input circuitry for receiving input power from power source;
a charging circuitry for receiving the input power and for charging the battery for the electric vehicle;
a processing system; and
a memory coupled to the processing system,
the processing system being configured to:
obtain battery usage metrics of the battery of the electric vehicle, the battery usage metrics being based upon past usage of the battery and past charging of the battery;
analyze the battery usage metrics to determine a target state of charge for a first type of vehicle usage;
receive a signal that the battery is coupled to the charging circuitry and is available for charging;
determine a charging scheme for the battery as a function of time to achieve the target state of charge at a first predetermined time, wherein the charging scheme includes a first time period and a second time period, the second time period beginning after the end of the first time period, wherein according to the charging scheme an average rate of delivering charge to the battery during the second time period is greater than an average rate of delivering charge to the battery during the first time period;

determine the charging scheme based, at least in part, on the combination of a first electricity cost rate, a second electricity cost rate, and whether an average state of charge of the battery over a prior time period exceeds a target average state of charge of the battery; and control the charging circuitry to charge the battery according to the charging scheme until the battery reaches the target state of charge;

wherein the target state of charge is less than a maximum state of charge for the battery, wherein the first electricity cost rate and the second electricity cost rate are available for charging at different times during the first and second time periods, the second electricity cost rate being higher than the first electricity cost rate, and wherein determining the charging scheme comprises making a determination to charge the battery such that a majority of charge is applied to the battery at the second electricity cost rate.

10. The system of claim 9, wherein the battery usage metrics include a metric based on a past state of charge history for the battery over a prior period of time.

11. The system of claim 10, wherein the battery usage metrics include a metric based on a past charging rate history for the battery over the prior period of time.

12. The system of claim 9, wherein the charging scheme for the battery is further based on one or more of an electricity cost profile, a maximum available charging rate, battery temperature, ambient environmental temperature, and a cost depreciation profile of the battery.

13. The system of claim 9, wherein the first electricity cost rate and the second electricity cost rate are available for charging at different times during the first and second time periods, the first electricity cost rate being lower than the second electricity cost rate, the processing system being configured to control charging so as to charge the battery at the second electricity cost rate and refrain from charging the battery at the first electricity cost rate.

14. The system of claim 9, the processing system being configured to: analyze the battery usage metrics to determine another target state of charge for a second type of vehicle usage, the second type of vehicle usage being different from the first type of vehicle usage; and determine another charging scheme for the battery as a function of time to achieve the second target state of charge at a second predetermined time.

15. A system for charging a battery of an electric vehicle, the system comprising:

a power-input circuitry for receiving input power from power source;

a charging circuitry for receiving the input power and for charging the battery for the electric vehicle;

a processing system; and a memory coupled to the processing system, the processing system being configured to:

obtain battery usage metrics of the battery of the electric vehicle, the battery usage metrics being based upon past usage of the battery and past charging of the battery;

analyze the battery usage metrics to determine a target state of charge for a first type of vehicle usage;

receive a signal that the battery is coupled to the charging circuitry and is available for charging;

determine a charging scheme for the battery as a function of time to achieve the target state of charge at a first predetermined time, wherein the charging scheme includes a first time period and a second time period, the second time period beginning after the end of the first time period, wherein according to the charging scheme an average rate of delivering charge to the battery during the second time period is greater than an average rate of delivering charge to the battery during the first time period; and control the charging circuitry to charge the battery according to the charging scheme until the battery reaches the target state of charge;

wherein the target state of charge is less than a maximum state of charge for the battery, wherein a first electricity cost rate and a second electricity cost rate are available for charging at different times during the first and second time periods, the second electricity cost rate being higher than the first electricity cost rate, and wherein determining the charging scheme comprises making a determination to charge the battery such that a majority of charge is applied to the battery at the second electricity cost rate, wherein the charging scheme as a function of time permits an average state of charge of the battery during the period of time the vehicle is charging to be less than a target average state of charge.

16. A system for charging a battery of an electric vehicle, the system comprising:

a power-input circuitry for receiving input power from power source;

a charging circuitry for receiving the input power and for charging the battery for the electric vehicle;

a processing system; and a memory coupled to the processing system, the processing system being configured to:

obtain battery usage metrics of the battery of the electric vehicle, the battery usage metrics being based upon past usage of the battery and past charging of the battery;

analyze the battery usage metrics to determine a target state of charge for a first type of vehicle usage;

receive a signal that the battery is coupled to the charging circuitry and is available for charging;

determine a charging scheme for the battery as a function of time to achieve the target state of charge at a first predetermined time, wherein the charging scheme includes a first time period and a second time period, the second time period beginning after the end of the first time period, wherein according to the charging scheme an average rate of delivering charge to the battery during the second time period is greater than an average rate of delivering charge to the battery during the first time period;

determine an initial state of charge of the battery; and responsive to the initial state of charge of the battery being below a predetermined threshold, determine the charging scheme to include an initial phase for charging the battery during an initial time period to a predetermined state of charge prior to the first time period, and control the charging circuitry to charge the battery according to the charging scheme until the battery reaches the target state of charge;

wherein the target state of charge is less than a maximum state of charge for the battery, wherein a first electricity cost rate and a second electricity cost rate are available for charging at different times during the first and second time periods, the second electricity cost rate being higher than the first electricity cost rate, and wherein determining the charging scheme comprises making a determination to charge the battery such that a majority of charge is applied to the battery at the second electricity cost rate.

* * * * *